Nov. 27, 1951 R. L. HIBBARD 2,576,114
MACHINE TOOL WORK HOLDER
Filed April 3, 1945 2 SHEETS—SHEET 1
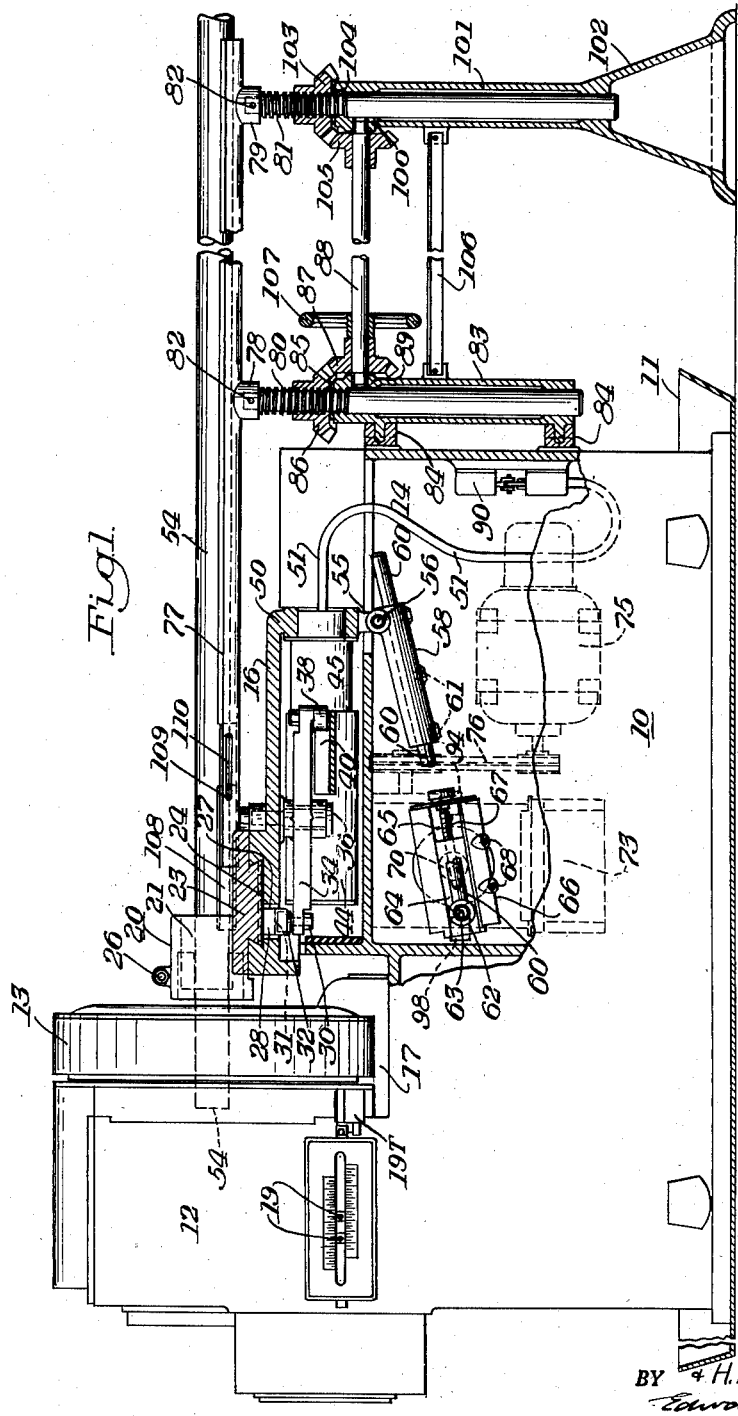
ROBERT L. HIBBARD
DECEASED
INVENTOR.
S.C. HIBBARD, R.L. HIBBARD Jr.
BY & H.M. JUNKIN, EXECUTORS
Edward A Lawrence
Attorney Nov. 27, 1951 R. L. HIBBARD 2,576,114
MACHINE TOOL WORK HOLDER
Filed April 3, 1945 2 SHEETS—SHEET 2
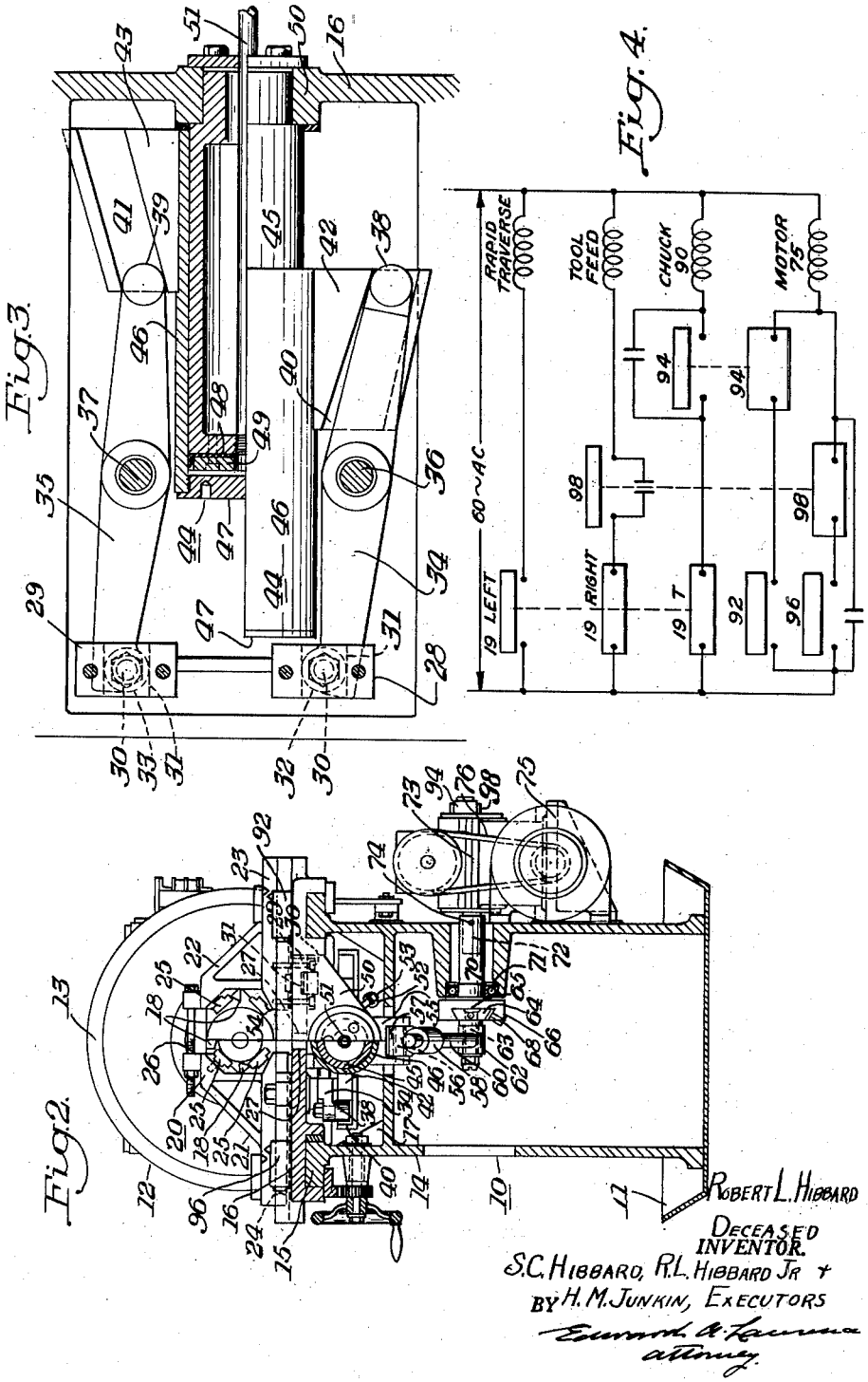

Patented Nov. 27, 1951

2,576,114

UNITED STATES PATENT OFFICE 2,576,114

MACHINE TOOL WORK HOLDER

Robert L. Hibbard, deceased, late of Bellevue, Pa., by Stewart C. Hibbard, Ross Township, Allegheny County, Pa., and Robert L. Hibbard, Jr., and Hays M. Junkin, Bellevue, Pa., executors, assignors of one-half to William K. Stamets, Mars, Pa.

Application April 3, 1945, Serial No. 586,402

2 Claims. (Cl. 10—105)

This invention relates generally to machine tools and more particularly to machine tool work holders and their operation in supporting, gripping and feeding the work for machining.

The principal object of this invention is the provision of a chuck arranged to automatically grip, feed, and hold the work during a machining operation. This invention is particularly advantageous for use with machines that cut off scrap ends or measured sections of pipes, rods, bars and the like where the work is supplied in lengths which are subsequently turned, shaped and cut off from stock forming independent work pieces and wherein the work progresses in the same direction.

Another object is the provision of improved chuck clamping mechanism.

Another object is the provision of improved work stock feeding mechanism which presents the work at the machining position in successive accurate lengths and retains it until the work piece is removed from the stock.

Another object is the provision of a work chucking and feeding mechanism arranged to present work piece sections of different lengths to the machining position of a machine tool.

Another object is the provision of a work chucking, feeding, and supporting mechanism for machine tools.

Other objects and advantages of this invention appear from the drawings of the mechanism illustrating this invention and in the following description and claims.

A practical embodiment illustrating the principles of this invention is shown in the accompanying drawings wherein:

Fig. 1 is a view partly in elevation and partly in section of a machine tool provided with the work chucking, feeding, and supporting mechanism comprising this invention.

Fig. 2 is an end view of the machine shown in Fig. 1 with parts shown in section.

Fig. 3 is a detailed plan view of the grip-actuating mechanism of the chuck.

Fig. 4 is an electrical circuit diagram of the machine tool control.

Referring to Figs. 1 and 2 of the drawings the machine tool shown is known as a cut off machine and is mounted on the bed 10 which is a large hollow casting that rests in the lubricant drip pan 11 and extends upwardly on the left to form the head stock housing 12 arranged to support and enclose the rotary drive and feed of the rotary machine tool head 13. The right or tail stock portion 14 of the bed casting 10 is provided with the ways 15 for slidably supporting the carriage 16. The intermediate portion of the bed casting 10 is recessed at 17 to provide clearance for the rotary tool head 13. The latter is provided with a series of radially disposed tools 18 which are fed radially by the driving mechanism within the housing 12. The position and length of stroke of the tools may be adjusted by relocating the fingers 19 longitudinally in the slot formed in the face of the housing 12 the details of which are not shown on the drawings.

The chuck 20 comprises the jaw members 21 and 22 each of which is provided with a dovetailed base 23 that fits in the mating transverse groove 24 formed in the top of the carriage 16. Each jaw member is arranged to carry two grip members 25 which are mounted in pairs diametrically disposed from each other. These grips are removable from their notched sockets to permit the use of grips of different size enabling the chuck to be employed for clamping stock of different cross-sectional shapes and size.

These jaw members 21 and 22 are movable relative to one another but they are limited in their retraction from each other by the tie rod or bolt 26 which passes through aligned holes in the upwardly extending lugs on top of the jaw members.

As shown in the sectional portion of Figs. 1 and 2 the bottom of the groove 24 is provided with spaced vertically open slots 27 through which the depending blocks 28 and 29 extend. Each block 28 and 29 is bolted to its respective jaw member 21 and 22 and is provided with a transverse slot or socket 31 which receives the rollers 32 and 33 rotatably mounted on the levers 34 and 35 by means of the bolts 30. The roller 32 is rotatably mounted on the top face of the end of the lever 34. The levers 34 and 35 are pivotally attached intermediate of their ends to the carriage 16 by means of the vertically disposed and horizontally spaced pivot pins 36 and 37. The other or right end of the levers 34 and 35 is provided with the depending rollers 38 and 39 which operate in the grooves 40 and 41 formed in the horizontal projections 42 and 43 on the opposite sides of the cylinder 44 which is slidable on the stationary piston 45 secured to the carriage 16.

In Fig. 1 the cylinder 44 is shown in its expanded position representing jaw members of the chuck in their closed position which matches the lower half or full lined portion of the cylinder 44 shown in Fig. 3. The upper half or sectioned portion of the cylinder 44 in Fig. 3 is shown fully telescoped which represents the retracted position of the jaw members. The same sides are represented in the same positions in Fig. 2. In this manner the different positions of the jaws and actuating structure are shown without unduly multiplying the drawings.

The cylinder 44 is made up of a tubular portion 46 bored to fit the perimetral surface of the stationary piston 45 and is closed at the outer end by the head 47. The piston is provided with the cupped seal 48 secured by the plate 49 that is bolted to the end thereof. The piston 45 is secured in a boss located in the center of the transverse flange 50 on the end of the carriage 16.

Fluid under pressure is supplied to the pressure chamber between the cylinder 44 and the piston 45 by means of the coaxially disposed pipe 51 which is controlled by a suitable valve, not shown, that is actuated to energize the cylinder 44 to move it to the left in Figs. 1 and 3 or to exhaust the cylinder and permit it to be returned to its retracted or telescoped position by means of the helical spring 52 which is connected between two posts, one secured to the cylinder and the other secured to the transverse flange 50 of the carriage 16 as shown at 53 in Fig. 2. Thus by energizing the cylinder 44 with fluid under pressure the fluid chamber expands, moving the cylinder 44 to the left and the rollers 38 and 39 riding in the grooves 40 and 41, which are inclined outwardly in opposite directions from the axis of the cylinder, causing the rollers 32 and 33 at the other end of the levers to converge and force the jaw members 21 and 22 to move the grips 25 into clamping engagement with the work or stock 54. The converging movement of the jaw members is limited by the bumper fixed to the carriage in the path of the cylinder head 47 or by the engagement of the grips with the work. The inclined grooves 40 and 41 provide a mechanical advantage between the cylinder 44 and the jaw members 21 and 22. The levers 34 and 35 are pivoted at their centers and merely transform the energy from longitudinal to transverse movement to actuate the jaw members.

A pair of spaced depending ears 55 are formed on the underside of the transverse flange 50 below the boss which supports the piston 45 on the carriage 16. These ears have aligned holes to receive the pivot pin 56 on which the transverse bearing 57 of the pitman socket member 58 is journaled. The pitman socket 58 is provided with a longitudinal bore to receive the pitman 60 which is adjustably secured therein at any desired position by means of the set screws 61. The other end of the pitman 60 is provided with the wrist pin bearing 62 pivotally supported on the wrist pin 63 secured in the adjustable crank arm block 64. The block 64 has a dovetail base slidably fitting the mating slot 65 in the crank arm 66 and may be adjusted along this slot by means of the screw 67 to change the length of the crank arm and the effective travel of the carriage. The block 64 may be locked in its adjusted position by means of the set screws 68.

The crank arm 66 is secured to the end of the rotary shaft 70 journaled in the anti-friction bearing 71 carried by a boss formed in the rear side of the base 10. The shaft 70 is hollow to receive the end of the shaft 72 protruding from the speed reducer 73. The shaft 72 is secured in the hollow shaft 70 by means of the pin 74. The speed reducer 73 is driven by the motor 75 through the belt connection 76 which is arranged to drive the crank arm through 180° steps to move the carriage forward and back through a predetermined distance.

The work or stock 54 is supported on the upwardly open V trough 77 having spaced sockets 78 and 79 secured to the under side thereof. These sockets are bored to receive the upper ends of the screw posts 80 and 81 respectively which are prevented from turning since they are secured therein by means of the pins 82. The screw post 80 is slidably mounted in the vertical bearing 83 which is fastened by spaced brackets 84 to the end of the bed 10. A thrust washer 85 is positioned on the top of the bearing 83 to provide a thrust bearing for the beveled gear 86 the bore of which is threaded to mate with the threads on the post 80. The beveled gear 86 meshes with the beveled gear 87 secured to the horizontal shaft 88 that is journaled at one end in the bearing 89 in the side of the vertical bearing 83 and at the other end in a similar bearing 100 in the side of the vertical bearing 101 supported by the stand 102. The bearing 101 is arranged to receive the post 81. The bore of the beveled gear 103 threadably engages the post 81 and this gear rests on the thrust washer 104 on the top of the bearing 101. The beveled gear 103 meshes with the beveled gear 105 secured on the right end of the shaft 88. The vertical bearings 83 and 101 are also secured to each other by the angle iron tie rod 106. A hand wheel 107 is secured to the horizontal shaft 88, preferably adjacent the machine, to permit the operator to rotate the shaft 88 and the beveled gears 87 and 105 to turn their mating beveled gears 86 and 103 in unison. Since the threads on the posts 80 and 81 are of the same pitch the trough 77 may be adjusted vertically and always maintained in a horizontal plane. In this manner the work or stock 54 may be raised or lowered to properly support the work relative to the chuck and the machine.

The V shaped trough 77 extends over the carriage 16. A short, light V shaped trough section 108 is placed in the left end of the trough 77 to provide an extension arranged to be adjustably secured by the bolts 109 projecting through the slots 110 in the sides of the trough 77 and enters threaded holes in the extension. The length of the slots 110 limits the movement of the trough extension 108.

When the trough 77 is adjusted vertically by the hand wheel 107 to support the stock 54 axially of the machine the grips 25 of the jaw members 21 and 22 will not admit the trough extension 108 when the carriage is completely retracted but if they happen to engage each other the extension 108 will be shoved back under the stock 54. However the trough 77 and its extension overhang the carriage 16 to support the stock 54 closely adjacent the chuck 20 and the extension 108 is set so that the carriage will not strike it when reciprocating to feed the work to the machine.

In operation the stock 54 is placed on the trough 77 which is adjusted vertically to accurately align it with the axis of the chuck 20 and the rotary tool head 13. The shifting movement of the carriage 16 is adjusted by means of the screw 67 which lengthens or shortens the crank arm. When this is accurately set the distance traveled by the advance of the carriage 16 represents the length of the sections of the work pieces to be severed from the stock 54. The carriage is then fully retracted and the short extension 108 of the V trough is set so that the carriage will not strike it.

The cylinder 44 is then energized to clamp the work stock in the chuck and the carriage is advanced to move the work to a gauged position. The chuck is released and the carriage is reset to its fully advanced position. The chuck is again energized to reclamp and hold the work in the machining position within the rotary tool head 13 as shown in Fig. 1. The machine is then started and the tools are fed as the tool head rotates to machine the work. When the feeding stroke of the tools has been completed the work piece is usually severed, permitting its removal from the other end of the machine.

When the tools complete the inward feed of the machining operation the left trip finger 19 is engaged and automatically changes the tool feeding motion to a rapid transverse motion which retracts the tools from the path of the work. This portion of the machine is disclosed in application Serial No. 586,401 filed April 3, 1945, which has matured into U. S. Patent No. 2,459,075, granted January 11, 1949. When the tools are fully retracted the right trip finger 19 is engaged which arrests further radial movement of the tools and deenergizes the solenoid valve 90 through the trip switch 19T to exhaust air from the cylinder 44 through the pipe 51, permitting the spring 52 to retract the jaw members 20 and 21 from clamping engagement.

As the jaw members move out of engagement with the work they open the switch 96 and strike the adjustable trip switch 92 which resets the trip switch 19T and energizes the motor 75 to revolve the crank arm 66 through 180° and thus opening the switch 98 and moving the carriage 16 to its fully retracted position, drawing the open chuck back over the work the predetermined distance fixed by the swing of the crank arm 66 which measures the length of the next work piece section. At this time the V trough fully supports the stock 54. As the crank arm 66 completes the 180° movement the trip switch 94 on the outer end of the shaft 74 deenergizes the motor 75 and energizes the solenoid valve 90 to admit fluid under pressure to the cylinder 44, causing the jaw members to open the switch 92 and clamp the work piece at the newly measured position. When the jaws close on the work piece the adjustable trip switch 96 energizes the motor 75 to revolve the crank arm 66 through 180° to open the switch 94 and advance the carriage 16, causing the chuck to drag the work stock along the trough and into machining position. As the crank arm completes this second 180° movement and the carriage is fully advanced the trip switch 98 stops the motor 75 and initiates the feeding movement of the tools in the rotating tool head. At the end of the machining operation the left trip finger 19 again stops the tool feeding motion and subject the tools to a rapid traverse or retraction until the right trip stops further radial movement of the tools after they clear the working throat sufficiently to permit the work stock 54 to be moved therein. These steps automatically repeat in the sequence stated until the whole of the work stock is machined or severed into accurate work piece lengths.

It is claimed:

1. In a work feeding device for supplying measured lengths of work to a rotary machining tool head, the combination of a support for an elongated work piece, a carriage slidably supported relative to the tool head, crank means for intermittently shifting the carriage a predetermined distance toward and away from the tool head, a chuck mounted on the carriage and arranged to grip and hold the work piece, and automatic control means including trip means effective when the carriage is fully retracted to close the chuck on the work piece, trip means effective when the chuck grips the work to move the carriage toward the tool head, trip means effective when the carriage is fully advanced and the work piece is in machining position to initiate the machining cycle of the tool head while the chuck holds the work, trip means effective at the end of the machining cycle to release the chuck, and trip means effective when the chuck releases the work piece to retract the carriage to automatically present and machine successive sections of the work piece.

2. In a device for feeding work to the rotary head of a machine tool, the combination of a carriage having a deck and slidable on ways of the machine tool, transversely movable clamping jaws mounted on the deck of the carriage, a lever for each clamping jaw pivotally supported on the under side of the deck, a slot in the under side of each jaw, a roller on the end of each lever arranged for movement in the slot of its respective clamping jaw, a cylinder mounted on the under side of the deck and arranged when energized to reciprocate between the levers, a wedge on each side of the cylinder engaging the other ends of the respective levers for oscillating them to open and close the jaw member when the cylinder is energized to reciprocate.

STEWART C. HIBBARD,
ROBERT L. HIBBARD, Jr.,
HAYS M. JUNKIN,
*Executors of Robert L. Hibbard, Deceased.*

REFERENCES CITED

The following references are of record in the file of this patent:

UNITED STATES PATENTS

| Number | Name | Date |
|---|---|---|
| 992,845 | Brochu et al. | May 23, 1911 |
| 1,336,501 | Blanckensee | Apr. 13, 1920 |
| 1,755,265 | Mueller | Apr. 22, 1930 |
| 1,782,692 | Lawson | Nov. 25, 1930 |
| 1,894,232 | Coe | Jan. 10, 1933 |
| 1,972,595 | Libby | Sept. 4, 1934 |
| 2,062,727 | Rich | Dec. 1, 1936 |
| 2,235,908 | Tyne | Mar. 25, 1941 |
| 2,262,178 | Gest et al. | Nov. 11, 1941 |
| 2,328,061 | Curtis | Aug. 31, 1943 |
| 2,389,556 | Siegerist | Nov. 20, 1945 |